(12) United States Patent
Bucci et al.

(10) Patent No.: US 6,379,645 B1
(45) Date of Patent: Apr. 30, 2002

(54) PRODUCTION OF HYDROGEN USING METHANATION AND PRESSURE SWING ADSORPTION

(75) Inventors: Donald Peter Bucci, Kutztown; John Michael Repasky, Allentown; Nirmal Chatterjee; Gregory David Snyder, both of Macungie, all of PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 09/418,086

(22) Filed: Oct. 14, 1999

(51) Int. Cl.[7] .............................. C01B 3/12; C01B 3/16
(52) U.S. Cl. .................... 423/655; 423/652; 423/656
(58) Field of Search ........................... 423/648.1, 650, 423/651, 652, 655, 656; 252/373

(56) References Cited

U.S. PATENT DOCUMENTS

| | | | |
|---|---|---|---|
| 3,430,418 A | * | 3/1969 | Wagner |
| 4,318,711 A | | 3/1982 | Smith |
| 4,409,196 A | * | 10/1983 | Skinner et al. .............. 423/359 |
| 4,778,670 A | * | 10/1988 | Pinto .......................... 423/650 |
| 4,963,339 A | | 10/1990 | Krishnamurthy et al. |
| 5,000,925 A | | 3/1991 | Krishnamurthy et al. |
| 5,112,590 A | * | 5/1992 | Krishnamurthy et al. ... 423/650 |

OTHER PUBLICATIONS

J. Yang et al., "Separation of Hydrogen Mixtures by a Two–Bed Pressure Swing Adsorption Process Using Zeolite 5A", Ind. Eng. Chem. Res., vol. 36, 1997, pp. 2789–2798, (No month).

D. W. Allen, "Methanator Design and Operation", Chemical Engineering Progress, vol. 69, No. 1 Jan. 1973, pp. 75–79.

J. R. Phillips, "II–B Methanation", Mississippi Chemical Corporation, pp. 311–319, (No date).

* cited by examiner

Primary Examiner—Wayne Langel
(74) Attorney, Agent, or Firm—Geoffrey L. Chase

(57) ABSTRACT

A process for recovering hydrogen products from a hydrogen/carbon oxide synthesis gas wherein removal of carbon oxides is accomplished in a pressure swing adsorption unit, by operating the pressure swing adsorption unit until carbon oxides break through into the effluent from the pressure swing adsorption unit, followed by passing the effluent from the pressure swing adsorption unit through a methanator to remove breakthrough carbon oxides from the pressure swing adsorption effluent.

20 Claims, 2 Drawing Sheets

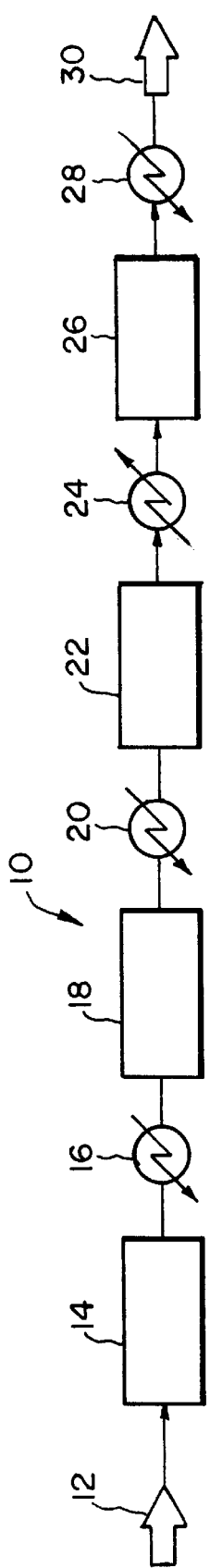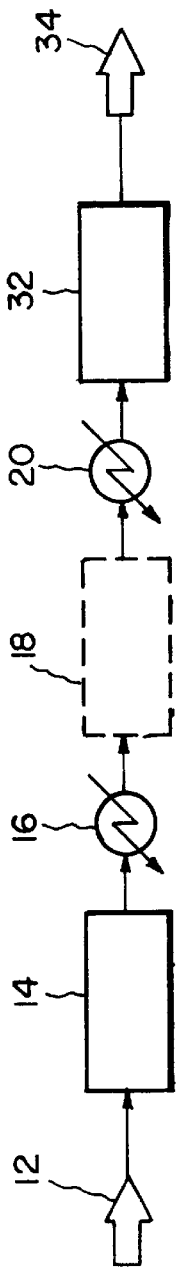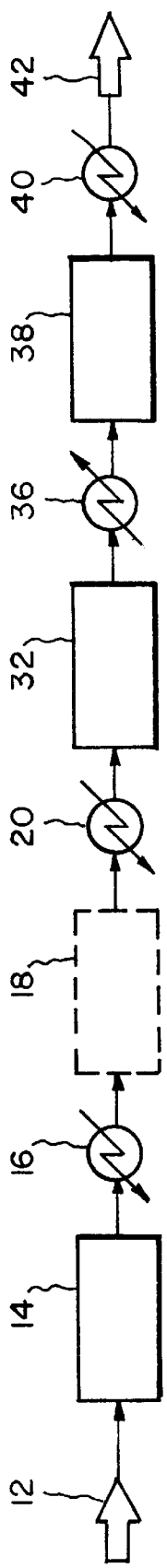

PRODUCTION OF HYDROGEN USING METHANATION AND PRESSURE SWING ADSORPTION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention pertains to production of hydrogen from a hydrogen/carbon oxide synthesis gas and/or a hydrogen feedstock.

Conventional hydrogen production facilities have a first part or a front end of the process that produces a synthesis gas consisting essentially of hydrogen, carbon monoxide, carbon dioxide and other gases such as nitrogen, argon, methane and water. Steam reformation of hydrocarbons is a well known process for production of the synthesis gas. In the basic process a hydrocarbon or a mixture of hydrocarbons is treated to remove trace contaminants such as sulfur and olefins which would adversely affect the reformer catalyst. Methane is the preferred starting material since it contains a higher proportion of hydrogen than other hydrocarbons. The hydrocarbon, after being treated for removal of adverse components, is combined with steam and the mixture is injected into a reformer furnace. The reformer furnace operates at an elevated temperature and is necessary in order to drive the reaction to completion, the reaction being endothermic.

As stated above the effluent from the reformer furnace is principally hydrogen, carbon monoxide and carbon dioxide with minor amounts of methane and other gases. In the conventional process, the effluent from the reformer furnace is introduced into a single or multi-stage shift reactor to form additional hydrogen and carbon dioxide by the conversion of carbon monoxide. In the shift reactor carbon monoxide is converted to carbon dioxide with the liberation of additional hydrogen by reaction in the presence of steam.

In one process the effluent from the reformer is subjected, first a high temperature shift reaction which takes place at temperatures of between about 600–850° F. utilizing an iron-chrome catalyst. After the high temperature shift reaction, the effluent is cooled with heat recovery and passed through a low temperature shift reaction where additional amounts of carbon monoxide are converted to carbon dioxide at a temperature of about 385° F. to 500° F. in the presence of a copper-zinc catalyst. The effluent from the low temperature shift reactor is sent to a heat recovery station so the effluent can be subjected to further processing. In the event the desired product is hydrogen, the effluent from the low temperature shift reactor is passed to an acid gas removal unit so that carbon dioxide can be removed by any of the well known carbon dioxide removal techniques such as using methyl ethyl amine (MEA) or methyl diethyl amine (MDEA). The effluent from the CO2 removal unit is subjected to a heat integration step whereby the temperature is adjusted so that the effluent, consisting mainly of hydrogen with minor amounts of carbon monoxide and carbon dioxide, as well as any trace gases present in the original synthesis gas such as argon and nitrogen, is sent to a methanation unit for conversion of the carbon monoxide and carbon dioxide.

In an attempt to improve on the process described above it has been proposed to eliminate the CO2 removal and the methanation steps and subject the effluent, after either a high temperature shift followed by a low temperature shift or a high temperature shift and heat recovery, to a pressure swing adsorption (PSA) unit operation for purification.

Use of a pressure swing adsorption step in production of hydrogen and carbon dioxide is disclosed in U.S. Pat. Nos. 4,963,339 and 5,000,925 wherein patentees disclose integrating a hydrogen PSA, carbon dioxide PSA and various recycle streams into a reformer process. Patentees discuss and disclose purification and recovery of the hydrogen PSA purge gas using pressure swing adsorption, distillation, compression and recycle. There is no discussion of the optimization of the hydrogen PSA unit operation through manipulation of the product hydrogen stream.

J. R. Phillips of the Mississippi Chemical Corporation, Yazoo City, Miss. is noted as the compiler of a section on gas purification in a text book titled Fetitizer, Science and Technology Services, No., 2, (1974) pages 311–319 section II-B entitled Methanation. In the section identified as II-B "methanation" the author discusses the need for methanation of carbon oxide streams in ammonia synthesis. The author explains the need to remove carbon monoxide from a synthesis gas stream to prevent damage to various ammonia and hydrogenation catalysts.

In an article titled Methanator Design And Operation which appeared in Volume 69 No. 1, pages 75–79 of Chemical Engineering Progress, the authors provide a general overview of the design and operation of methanation units and the potential hazards of nickel carbonyl.

An article entitled Separation Of Hydrogen Mixtures by a Two-Bed Pressure Swing Adsorption Process Using Zeolite 5A, which appeared in Ind. Eng. Chem. Res. Volume 36 No. 7, pages 2789–2798, discusses experimental and theoretical development regarding the bulk separation of hydrogen/carbon monoxide ($H_2/CO$) and hydrogen/methane ($H_2/CH_4$) mixtures using pressure swing adsorption technology. The effects of various process parameters and a mathematical model are disclosed.

U.S. Pat. No. 4,318,711 discloses a process to upgrade low BTU feed gas formed by gasification of carbonaceous materials to a high BTU gas. The process disclosed includes carbon dioxide removal, carbon monoxide removal, hydrogen production via the well known steam-iron process, drying and methanation. There is no disclosure of the utilization of pressure swing adsorption in such a process. Patentees claim it will be unnecessary to purify the hydrogen gas or any of the other gases, except for water removal, before introduction of the gas into the methanation zone to produce the higher BTU product gas.

There is no teaching or suggestion in the art that the production of hydrogen from a hydrogen/carbon oxides synthesis gas can be improved by the use of a combination of the well known methanation and pressure swing adsorption processes.

BRIEF SUMMARY OF THE INVENTION

The main objective of the present invention is to increase hydrogen recovery from synthesis gas using a pressure swing adsorption (PSA) unit. The present invention utilizes a methanator down stream of the PSA unit to treat the entire product hydrogen stream or some portion thereof to remove trace amounts of carbon oxides, e.g. CO and CO2, which are allowed to escape or breakthrough during a normal PSA cycle. According to the present invention the process permits an increase in the cycle time beyond carbon oxide impurity breakthrough by methanating residual carbon oxides to methane.

Therefore, in one aspect, the present invention is a method for increasing the recovery of hydrogen from hydrogen/carbon oxide synthesis gas comprising the steps of: (a) passing the synthesis gas stream through one of a high temperature shift reactor, a medium temperature shift reactor, a low temperature shift reactor or a combination thereof to convert carbon monoxide and water vapor in the stream to carbon dioxide and hydrogen; (b) passing the synthesis gas stream exiting the shift reactor(s), after heat recovery, through a pressure swing adsorption unit adapted to remove carbon oxides from the stream; the pressure swing adsorption unit operated for a cycle time beyond which carbon oxide impurities breakthrough the pressure swing adsorption unit and are contained in an effluent from said pressure swing adsorption unit; and (c) passing said effluent from step (b) through a methanator to convert residual carbon oxides in said effluent to methane to produce a purified hydrogen stream with a volumetric increase in hydrogen recovery from the pressure swing adsorption unit.

In another aspect, the present invention is a process for recovering hydrogen from a hydrogen/carbon oxide synthesis gas wherein the synthesis gas is subjected to shift reaction to convert carbon monoxide to carbon dioxide followed by treating an effluent from the shift reaction in a pressure swing adsorption unit to yield a purified hydrogen stream containing no carbon oxides, the improvement comprising: operating the pressure swing adsorption unit under a cycle time wherein carbon oxides breakthrough and are present in an effluent from the pressure swing adsorption unit; and passing the effluent from the pressure swing adsorption unit through a methanator to convert residual carbon oxides to methane to produce a purified hydrogen stream with a volumetric increase in hydrogen recovery from the pressure swing adsorption unit.

According to yet another aspect, the present invention is a process, wherein the effluent from the pressure swing adsorption step is divided into at least two streams, a first stream being subjected to heat recovery followed by methanation and a second stream split into two sub-streams, a first sub-stream being subjected to heat recovery and methanation and a second sub- stream recovered without further treatment as hydrogen product.

In a further aspect, the present invention is a process for recovering hydrogen from a hydrogen/carbon oxide synthesis gas wherein the synthesis gas is subjected to shift reaction to convert carbon monoxide and steam to carbon dioxide and hydrogen followed by treating an effluent from the shift reaction, after heat recovery, in a pressure swing adsorption unit to yield a purified hydrogen stream containing essentially no carbon oxides the improvement comprising operating the pressure swing adsorption unit under a cycle time wherein carbon oxides breakthrough are present in an effluent from the pressure swing adsorption unit; and passing the effluent from the pressure swing adsorption unit through a methanator to convert residual carbon oxides to methane to produce a purified hydrogen stream, whereby there is a volumetric increase in hydrogen recovery from the pressure swing adsorption unit.

In a still further aspect, the present invention is a process for recovering hydrogen from a hydrogen/carbon oxide synthesis gas wherein said synthesis gas is subjected to shift reaction to convert carbon monoxide and steam to carbon dioxide and hydrogen followed by treating an effluent from the shift reaction, after heat recovery, in a pressure swing adsorption unit to yield a purified hydrogen stream containing essentially no carbon oxides the improvement comprising operating the pressure swing adsorption unit under a cycle time wherein carbon oxides breakthrough are present in an effluent from the pressure swing adsorption unit; and passing the effluent from the pressure swing adsorption unit through a methanator to convert residual carbon oxides to methane to produce a purified hydrogen stream, whereby there is a volumetric increase in hydrogen recovery from the pressure swing adsorption unit.

BRIEF DESCRIPTION OF SEVERAL VIEWS OF THE DRAWINGS

FIG. 1 is a block diagram illustrating a prior art process for hydrogen purification utilizing methanation.

FIG. 2 is a block diagram representing a process for purification of hydrogen using pressure swing adsorption.

FIG. 3 is a block diagram of the process according to one aspect of the present invention.

DETAILED DESCRIPTION OF THE INVENTION

Figure 4:
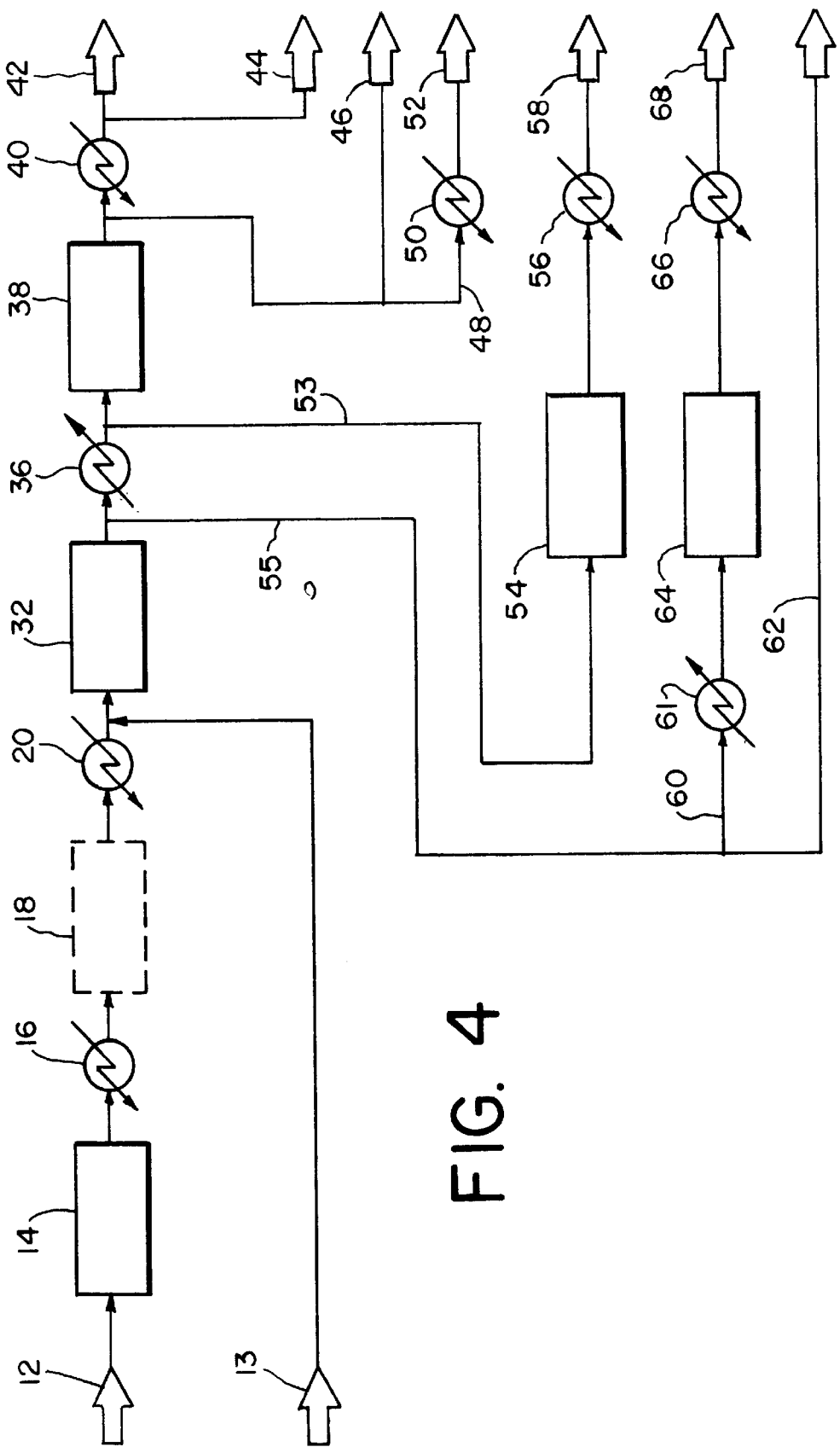
FIG. 4 is a block diagram of an embodiment of the present invention wherein multiple hydrogen product streams can be produced using the process of the present invention.

FIG. 1, depicts a process scheme 10 which has been used to purify a synthesis gas denoted by arrow 12 which is produced from the front end of a hydrogen production facility or the steam reformation portion of a hydrogen production facility. The synthesis gas 12 consisting mainly of hydrogen and carbon monoxide, and other gases such as carbon dioxide, water vapor, argon and nitrogen, and other trace elements unimportant for the purposes of this invention is sent to a high temperature shift reactor 14 where the synthesis gas is reacted over a temperature range of between about 600° F. and 850° F. and passed over an iron-chrome catalyst so that the major portion or all of the carbon monoxide is converted to carbon dioxide. The effluent from the high temperature shift reactor 14 is subject to heat recovery in a suitable device 16 and passed to a low temperature shift reactor 18 where the effluent is reacted over a temperature range between about 385° F. to 500° F. in the presence of a copper-zinc catalyst to further convert carbon monoxide to carbon dioxide. The effluent from the low temperature reactor 18 is subjected to heat recovery in a suitable heat recovery device 20 and then passed to a carbon dioxide removal unit 22 where the carbon dioxide is removed by such processes as methyl ethyl amine adsorption or methyl diethyl amine adsorption. The hydrogen rich effluent from the carbon dioxide removal step 22 is subjected to a heat integration 24 where the temperature is adjusted so that it can be passed to a methanator or methanation unit 26 for methanation of the remaining carbon oxides to methane and water with trace amounts of nitrogen remaining in the effluent from the methanator 26 which is once again subject to heat recovery 28 and delivered as a product which is shown by arrow 30. The product 30 is essentially hydrogen with methane, water and nitrogen plus any argon present in the initial mixture, which impurities are acceptable to most users of the hydrogen product stream.

Referring to FIG. 2, the synthesis gas 12 is once again subjected to a high temperature shift reaction 14, heat recovery 16 and optionally a low temperature shift reaction 18 followed by heat recovery 20. The effluent from the low temperature or the high temperature shift reactor is sent to a pressure swing adsorption unit 32 where the hydrogen is purified by removal of the residual carbon oxides yielding a hydrogen product stream 34 which contains essentially hydrogen with trace amounts of nitrogen, methane and carbon oxides.

FIG. 3, shows a process according to the present invention where the synthesis gas 12 is passed through the high temperature shift reactor 14, heat recovery 16, optionally a low temperature shift reactor 18, and heat recovery 20, a PSA unit 32, a heat integration unit 36, a methanator 38, and a heat recovery unit 40 yielding a hydrogen product shown by arrow 42. In the process scheme shown in FIG. 3, the PSA unit is followed by a methanation unit so that the PSA unit can be modified to extend the cycle time beyond the time at which carbon oxide impurity breakthrough occurs in the PSA unit. Increasing the cycle time will typically result in increased recovery of hydrogen from the synthesis gas feed to the PSA unit. The methanator is then operated to eliminate breakthrough carbon oxides in the effluent stream from the PSA unit to result in a product hydrogen stream that contains trace quantities of methane and water. The product stream from the methanator may also contain trace quantities of nitrogen, if nitrogen was present in the original feed stream, and is allowed to breakthrough into the PSA hydrogen product stream.

Referring to FIG. 4, the process of the present invention can be modified in a number of ways to produce several hydrogen product streams of varying degrees of purity. For example, in one simple modification the effluent from heat recovery operation 40 can be split into two product streams, thus producing hydrogen product streams 44 and 42.

Alternatively, a side stream can be taken from the effluent from the methanation step 38 and split into two streams 46 and 48 with stream 46 exiting the process at the temperature of the methanation step and stream 48 being subject to heat recovery in an additional heat recovery unit 50 to produce a product stream 52. It is also possible to take a stream 53 after heat addition station 36 and pass stream 53 through a remotely located methanator 54 and heat recovery station 56 to produce a hydrogen product stream 58 at a different location from product stream 42.

A side stream 55 can be removed after the pressure swing adsorption step 32 before heat recovery 36 for transfer to a remote location. In this variation stream 55 can, in one regime be divided into two sub-streams 60, 62 one of which (60) is subject to methanation in a methanation unit 64 followed by heat recovery 66 yielding a hydrogen product stream 68. Stream 62 can be delivered without methanation as a hydrogen product stream where trace amounts of carbon oxides which are allowed to breakthrough or in the event the PSA unit is operated without carbon oxide breakthrough to deliver a purified hydrogen product stream. In this variation stream 55 can be included to produce either a purified hydrogen product stream (68) or a stream (62) with trace amounts of carbon oxides.

An additional synthesis gas supply 13 treated to contain substantially hydrogen can be introduced directly into the PSA unit for processing as shown in FIG. 4.

Table 1 sets forth data taken from an existing plant that produces hydrogen utilizing steam reformation. The data presented in Table 1 is for treatment of the synthesis gas subsequent to the steam reformation operation.

TABLE 1

|  |  | HTS (1) | | LTS (2) | | $CO_2$ Removal | | Methanation | | Hydrogen |
|---|---|---|---|---|---|---|---|---|---|---|
|  |  | Inlet | Outlet | Inlet | Outlet | Inlet | Outlet | Inlet | Outlet | Product |
| Pressure | psia | 310 | 307 | 307 | 305 | 305 | 303 | 303 | 300 | 296 |
| Temperature | F. | 722 | 772 | 431 | 442 | 144 | 108 | 570 | 590 | 90 |
| Hydrogen | mol % | 37.790 | 40.370 | 39.240 | 39.800 | 77.010 | 91.610 | 91.610 | 91.460 | 92.590 |
| Carbon Monoxide | mol % | 3.212 | 0.630 | 0.612 | 0.055 | 0.107 | 0.127 | 0.127 | 0.000 | 0.000 |
| Carbon Dioxide | mol % | 5.350 | 7.932 | 7.712 | 8.269 | 15.930 | 50 ppm | 50 ppm | 0.000 | 0.000 |
| Nitrogen | mol % | 0.056 | 0.056 | 0.054 | 0.054 | 0.104 | 0.124 | 0.124 | 0.125 | 0.126 |
| Methane | mol % | 3.041 | 3.041 | 2.955 | 2.955 | 5.719 | 6.803 | 6.803 | 6.947 | 7.033 |
| Water | mol % | 50.540 | 47.960 | 49.420 | 48.860 | 1.122 | 1.335 | 1.335 | 1.465 | 0.248 |
| Total | mol % | 99.988 | 99.988 | 99.993 | 99.993 | 99.992 | 99.998 | 99.998 | 99.996 | 99.997 |

Note:
Values do not total to exactly 100% due to lack of significant figures in the hydrogen and water mole fractions.
(1) High Temperature Shift
(2) Low Temperature Shift From the foregoing data it is apparent that the production of hydrogen utilizing the prior art technique results in a hydrogen purity of about 93 mole percent.

Table 2 sets forth data for carbon oxide removal and methanation of a synthesis gas used in the production of ammonia ($NH_3$).

TABLE 2

|  |  | HTS (1) | | LTS (2) | | $CO_2$ Removal | | Methanation | | Hydrogen |
|---|---|---|---|---|---|---|---|---|---|---|
|  |  | Inlet | Outlet | Inlet | Outlet | Inlet | Outlet | Inlet | Outlet | Product |
| Pressure | psia | 408 | 399 | 388 | 374 | 366 | 365 | 361 | 359 | 356 |
| Temperature | F. | 650 | 798 | 400 | 408 | 190 | 110 | 525 | 574 | 100 |
| Hydrogen | mol % | 45.185 | 52.905 | 51.920 | 53.502 | 74.807 | 98.364 | 98.364 | 97.971 | 97.971 |
| Carbon Monoxide | mol % | 10.640 | 2.920 | 2.866 | 0.200 | 0.279 | 0.367 | 0.367 | 0.000 | 0.000 |

TABLE 2-continued

|  |  | HTS (1) | | LTS (2) | | CO₂ Removal | | Methanation | | Hydrogen |
|---|---|---|---|---|---|---|---|---|---|---|
|  |  | Inlet | Outlet | Inlet | Outlet | Inlet | Outlet | Inlet | Outlet | Product |
| Carbon Dioxide | mol % | 5.582 | 13.302 | 13.055 | 15.406 | 21.486 | 0.005 | 0.005 | 0.000 | 0.000 |
| Nitrogen | mol % | 0.033 | 0.033 | 0.032 | 0.032 | 0.044 | 0.058 | 0.058 | 0.058 | 0.058 |
| Methane | mol % | 0.461 | 0.461 | 0.452 | 0.444 | 0.620 | 0.815 | 0.815 | 1.197 | 1.197 |
| Water | mol % | 38.085 | 30.365 | 31.662 | 30.405 | 2.746 | 0.367 | 0.367 | 0.750 | 0.750 |
| Argon | mol % | 0.013 | 0.013 | 0.013 | 0.013 | 0.018 | 0.023 | 0.023 | 0.023 | 0.023 |
| Total | mol % | 100.000 | 100.000 | 100.000 | 100.000 | 100.000 | 100.000 | 100.000 | 100.000 | 100.000 |

(1) High Temperature Shift
(2) Low Temperature Shift

From the data presented in Table 2, it is apparent that when the content of the synthesis gas is higher in hydrogen the hydrogen product will be of improved purity.

Table 3 sets forth a simulation of a pressure swing adsorption unit integrated into an existing hydrogen production facility.

entirely eliminated from the process stream. However, there is an increase in nitrogen, methane and water content using the process of the present invention. These impurities can usually be tolerated in most processes that would utilize the hydrogen product stream to which the invention would be applied.

TABLE 3

|  |  | HTS (1) | | LTS (2) | | PSA | | Hydrogen |
|---|---|---|---|---|---|---|---|---|
|  |  | Inlet | Outlet | Inlet | Outlet | Inlet | Outlet | Product |
| Pressure | psia | 524 | 520 | 515 | 510 | 492 | 488 | 488 |
| Temperature | F. | 610 | 728 | 413 | 442 | 72 | 73 | 73 |
| Hydrogen | mol % | 45.432 | 51.697 | 51.697 | 53.191 | 74.085 | 99.995 | 99.995 |
| Carbon Monoxide | mol % | 7.957 | 1.692 | 1.692 | 0.198 | 0.276 | 1 ppm | 1 ppm |
| Carbon Dioxide | mol % | 5.433 | 11.698 | 11.698 | 13.192 | 18.314 | 0.000 | 0.000 |
| Nitrogen | mol % | 0.263 | 0.263 | 0.263 | 0.263 | 0.367 | 50 ppm | 50 ppm |
| Methane | mol % | 4.933 | 4.933 | 4.933 | 4.933 | 6.870 | 2 ppm | 2 ppm |
| Water | mol % | 35.982 | 29.717 | 29.717 | 28.223 | 0.088 | 0.000 | 0.000 |
| Total | mol % | 100.000 | 100.000 | 100.000 | 100.000 | 100.000 | 100.000 | 100.000 |

(1) High Temperature Shift
(2) Low Temperature Shift

From the data set forth in Table 3, simulation points to the fact that utilization of a pressure swing adsorption process can further enhance purity of hydrogen in the final product.

Table 4 sets forth a simulation of the process of the present invention integrated into the same process used for the simulation in FIG. 3.

Thus it is apparent that the present invention, combining pressure swing adsorption followed by methanation in series, is of great value to the production of hydrogen where low levels of carbon oxide impurities are particularly detrimental but low levels of methane and water may be

TABLE 4

|  |  | HTS (1) | | LTS (2) | | CO₂ Removal | | Methanation | | Hydrogen |
|---|---|---|---|---|---|---|---|---|---|---|
|  |  | Inlet | Outlet | Inlet | Outlet | Inlet | Outlet | Inlet | Outlet | Product |
| Pressure | psia | 524 | 520 | 515 | 510 | 492 | 488 | 488 | 488 | 488 |
| Temperature | F. | 610 | 729 | 413 | 442 | 72 | 73 | 525 | 525 | 100 |
| Hydrogen | mol % | 45.524 | 51.817 | 51.817 | 53.326 | 74.151 | 99.935 | 99.935 | 99.930 | 99.930 |
| Carbon Monoxide | mol % | 8.002 | 1.709 | 1.709 | 0.200 | 0.278 | 50 ppm | 50 ppm | 0.000 | 0.000 |
| Carbon Dioxide | mol % | 5.422 | 11.715 | 11.715 | 13.225 | 18.330 | 0.000 | 0.000 | 0.000 | 0.000 |
| Nitrogen | mol % | 0.263 | 0.263 | 0.263 | 0.263 | 0.366 | 500 ppm | 500 ppm | 500 ppm | 500 ppm |
| Methane | mol % | 4.881 | 4.881 | 4.881 | 4.881 | 6.788 | 100 ppm | 100 ppm | 150 ppm | 150 ppm |
| Water | mol % | 35.907 | 29.614 | 29.614 | 28.105 | 0.088 | 0.000 | 0.000 | 50 ppm | 50 ppm |
| Total | mol % | 100.000 | 100.000 | 100.000 | 100.000 | 100.000 | 100.000 | 100.000 | 100.000 | 100.000 |

(1) High Temperature Shift
(2) Low Temperature Shift

From Table 4 it can be seen that with the process according to the present invention carbon oxides can be accepted. Refinery hydrogen supply to an isomerization unit is one example of such an application.

According to the present invention the synthesis gas consisting essentially of hydrogen and carbon oxides and other gases such as nitrogen, argon, methane and water can be reacted over temperature of between about 600° F. and 850° F. over an iron-chrome catalyst (high temperature shift), reacted over a temperature of between about 400° F. to 650° F. over a copper-zinc catalyst (medium temperature shift), reacted over a temperature of between about 385° F. to 500° F. over a copper-zinc catalyst (low-temperature shift), or a combination of such reactors in series followed by a heat recovery after each shift reaction. Thereafter the effluent from the shift reactor or the last of the series of shift reactors can be sent to the pressure swing adsorption unit, followed by heat addition and methanation.

The process of the present invention will typically benefit existing hydrogen production facilities by improving hydrogen production efficiency and increasing the maximum hydrogen production capacity of the facility. The process of the present invention can be installed in new facilities to improve hydrogen production efficiency and reduce overall hydrogen plant capital cost.

Having thus described our invention what is desired to be secured by Letters Patent of the United States is set forth in the appended claims which should be read without limitation.

What is claimed is:

1. A method for increasing the recovery of hydrogen from hydrogen/carbon oxide synthesis gas comprising the steps of:
    (a) subjecting said synthesis gas stream to a step selected from the group consisting of, a high temperature shift, medium temperature shift, low temperature shift, and a combination thereof to convert carbon monoxide and water vapor in said stream to carbon dioxide and hydrogen;
    (b) passing said synthesis gas stream after said shift or followed by heat recovery, through a pressure swing adsorption unit adapted to remove carbon oxides from said stream; said pressure swing adsorption unit operated for a cycle time beyond which carbon oxide impurities breakthrough the pressure swing adsorption unit and are contained in an effluent from said pressure swing adsorption unit; and
    (c) passing said effluent from step (b) through a methanator to convert residual carbon oxides in said effluent to methane to produce a purified hydrogen stream with a volumetric increase in hydrogen recovery from said pressure swing adsorption unit.

2. A method according to claim 1, including the step of passing said effluent from said high temperature shift reactor through a low temperature shift reactor to increase the amount of hydrogen in the synthesis gas stream prior to entering said pressure swing adsorption unit.

3. In a process for recovering hydrogen from a hydrogen/carbon oxide synthesis gas wherein said synthesis gas is subjected to a high temperature shift reaction to convert carbon monoxide and steam to carbon dioxide and hydrogen followed by treating an effluent from said shift reaction, after heat recovery, in a pressure swing adsorption unit to yield a purified hydrogen stream containing essentially no carbon oxides the improvement comprising:
    operating said pressure swing adsorption unit under a cycle time wherein carbon oxides breakthrough are present in an effluent from said pressure swing adsorption unit; and
    passing said effluent from said pressure swing adsorption unit through a methanator to convert residual carbon oxides to methane to produce a purified hydrogen stream, whereby there is a volumetric increase in hydrogen recovery from said pressure swing adsorption unit.

4. A process according to claim 3, including passing said effluent from said high temperature shift reactor through a low temperature shift reactor to increase the amount of hydrogen in the synthesis gas stream prior to entering said pressure swing adsorption unit.

5. A process according to claim 3, wherein a separate stream of hydrogen/carbon oxides with or without hydrocarbons is processed separately or is mixed with said effluent from said shift reactor prior to entering said pressure swing adsorption unit.

6. A process according to claim 3, wherein said effluent from said pressure swing adsorption step is divided into at least two streams, a first stream being subjected to heating followed by methanation and a second stream split into two sub-streams a first sub-stream being subjected to heating and methanation and a second sub-stream recovered without further methanation treatment as hydrogen product.

7. A process according to claim 6, wherein said first stream after heat recovery is split into two streams each of which is subject to methanation in a separate methanator and further treated to result in two or more hydrogen product streams.

8. A process according to claim 6, wherein said first sub-stream, after methanation is subject to heat recovery to yield a hydrogen product stream.

9. In a process for recovering hydrogen from a hydrogen/carbon oxide synthesis gas wherein said synthesis gas is subjected to a high temperature shift reaction to convert carbon monoxide and steam to carbon dioxide and hydrogen followed by treating an effluent from said shift reaction, after heat recovery, in a pressure swing adsorption unit to yield a purified hydrogen stream containing essentially no carbon oxides the improvement comprising:
    operating said pressure swing adsorption unit under a cycle time wherein carbon oxides breakthrough are present in an effluent from said pressure swing adsorption unit; and
    passing said effluent from said pressure swing adsorption unit through a methanator to convert residual carbon oxides to methane to produce a purified hydrogen stream, whereby there is a volumetric increase in hydrogen recovery from said pressure swing adsorption unit.

10. A process according to claim 9, including passing said effluent from said high temperature shift reactor through a low temperature shift reactor to increase the amount of hydrogen in the synthesis gas stream prior to entering said pressure swing adsorption unit.

11. A process according to claim 9, wherein a separate stream of hydrogen/carbon oxides with or without hydrocarbons is processed separately or is mixed with said effluent from said shift reactor prior to entering said pressure swing adsorption unit.

12. A process according to claim 9, wherein said effluent from said pressure swing adsorption step is divided into at least two streams, a first stream being subjected to heating followed by methanation and a second stream split into two sub-streams a first sub-stream being subjected to heating and methanation and a second sub-stream recovered without further methanation treatment as hydrogen product.

13. A process according to claim 12, wherein said first stream after heat recovery is split into two streams each of which is subject to methanation in a separate methanator and further treated to result in two or more hydrogen product streams.

14. A process according to claim 13, wherein said first sub-stream, after methanation is subject to heat recovery to yield a hydrogen product stream.

15. In a process for recovering hydrogen from a hydrogen/carbon monoxide synthesis gas wherein said synthesis gas is subjected to a high temperature shift reaction to convert carbon monoxide and steam to carbon dioxide and hydrogen followed by treating an effluent from said shift reaction, after heat recovery, in a pressure swing adsorption unit to yield a purified hydrogen stream containing essentially no carbon oxides the improvement comprising:

operating said pressure swing adsorption unit under a cycle time wherein carbon oxides breakthrough are present in an effluent from said pressure swing adsorption unit; and passing said effluent from said pressure swing adsorption unit through a methanator to convert residual carbon oxides to methane to produce a purified hydrogen stream, whereby there is a volumetric increase in hydrogen recovery from said pressure swing adsorption unit.

16. A process according to claim 15, including passing said effluent from said high temperature shift reactor through a low temperature shift reactor to increase the amount of hydrogen in the synthesis gas stream prior to entering said pressure swing adsorption unit.

17. A process according to claim 15, wherein a separate stream of hydrogen/carbon oxides with or without hydrocarbons is mixed with said effluent from said shift reactor prior to entering said pressure swing adsorption unit.

18. A process according to claim 15, wherein said effluent from said pressure swing adsorption step is divided into at least two streams, a first stream being subjected to heating followed by methanation and a second stream split into two sub-streams a first sub-stream being subjected to heating and methanation and a second sub-stream recovered without further methanation treatment as hydrogen product.

19. A process according to claim 18, wherein said first stream after heat recovery is split into two streams each of which is subject to methanation in a separate methanator and further treated to result in two or more hydrogen product streams.

20. A process according to claim 18, wherein said first stream after heat recovery is split into two streams each of which is subject to methanation in a separate methanator and further treated to result in two or more hydrogen product streams.

* * * * *